United States Patent [19]
Etienne et al.

[11] 4,314,882
[45] Feb. 9, 1982

[54] DEVICE FOR ACTUATING A NUCLEAR REACTOR CONTROL ROD

[75] Inventors: Claude Etienne, Aix en Provence; Claude Fardouet, Massy; Guy Mercier L'Abbe, Aix en Provence, all of France

[73] Assignee: Commissariat a L'Energie Atomique, Paris, France

[21] Appl. No.: 60,226

[22] Filed: Jul. 24, 1979

[30] Foreign Application Priority Data

Jul. 27, 1978 [FR] France .................................. 78 22253

[51] Int. Cl.³ .............................................. G21C 7/14
[52] U.S. Cl. .................................................... 376/235
[58] Field of Search ............................................ 176/36

[56] References Cited

U.S. PATENT DOCUMENTS

| | | |
|---|---|---|
| 3,572,161 | 3/1971 | Lichtenberger et al. ......... 176/36 R |
| 3,775,297 | 11/1973 | Ode et al. ........................ 176/36 R |
| 3,902,963 | 9/1975 | Bertone et al. ................... 176/36 R |
| 3,959,071 | 5/1976 | Bevilaoquq ...................... 176/36 R |
| 4,073,684 | 2/1978 | Cepkauskas ..................... 176/36 R |
| 4,092,213 | 5/1978 | Nishimura ....................... 176/36 R |

FOREIGN PATENT DOCUMENTS

| | | |
|---|---|---|
| 1100831 | 3/1961 | Fed. Rep. of Germany .... 176/36 R |
| 2219951 | 11/1973 | Fed. Rep. of Germany .... 176/36 R |
| 1805976 | 5/1976 | Fed. Rep. of Germany .... 176/36 R |
| 2098236 | 3/1973 | France ............................. 176/36 R |

Primary Examiner—Sal Cangialosi
Attorney, Agent, or Firm—Pearne, Gordon, Sessions, McCoy & Granger

[57] ABSTRACT

A first assembly for low-speed translational displacement and dropping of a control rod comprises a leak-tight casing tube which communicates with the reactor vessel, a screw and nut system coupled to the control rod by means of the nut and a screw-retaining device which is capable of releasing the screw. In the event of accidental failure of the casing tube, upward displacement of the control rod and of the broken portion of the casing tube is limited by a second assembly comprising means for rotational locking of the screw drive rotor and calibrated elastic means for producing action on the rotor in opposition to the vertical thrust produced by failure of the casing tube.

5 Claims, 5 Drawing Figures

DEVICE FOR ACTUATING A NUCLEAR REACTOR CONTROL ROD

This invention relates to a device for actuating a nuclear reactor control rod.

In more precise terms, the aim of the present invention is to prevent ejection of the control rods of a nuclear reactor in the event either of depressurization of the reactor vessel or of overturning of the reactor.

It is recalled that the power level of a nuclear reactor is usually adjusted by inserting control rods to varying depths within the reactor core, said control rods being intended to have a high neutron absorption capacity.

It is known that any mechanism for actuating a control rod must permit not only the upward and downward displacement of the rod but also a fast drop in the event of a sudden increase in reactivity. Thus in the case under consideration, the device for actuating a control rod comprises a screw and nut system coupled to the control rod by means of the screw in order to obtain slow movements of translation of the control rod and a screw-retaining device which is capable of releasing the screw at any moment. The design function of the screw and nut system is to ensure upward displacement of the screw to the retaining device after dropping of the control rod.

It is also known in a general manner that a control-rod actuating device (with the exception of the elements for controlling the device) is disposed along the axis of the control rod to be actuated and extends upwards above the lid or so-called closure head of the reactor pressure vessel with a leak-tight casing tube which is rigidly fixed to said closure head and is in communication with said pressure vessel.

However, control rod actuating devices designed prior to the present invention suffer from a disadvantage in that they do not prevent ejection of a control rod, on the one hand in the event of depressurization of the reactor vessel as a result of failure of said leak-tight casing tube and, on the other hand, in the event of overturning in the case of a ship-borne reactor.

The precise aim of the present invention is to provide a control-rod actuating device which makes it possible to overcome the disadvantage just mentioned and to guarantee that a control rod will be maintained within the reactor core in the event of any incident of the type mentioned above.

Said device for actuating a nuclear reactor control rod is of the type comprising an assembly or so-called first assembly for carrying out a low-speed translational displacement and dropping of the control rod. Said assembly comprises a leak-tight casing tube rigidly fixed to the closure head of the nuclear reactor pressure vessel and adapted to communicate with said pressure vessel, a screw and nut system coupled to the control rod by means of the nut and a screw-retaining device which is capable of releasing said screw. The nut is secured against rotational motion and guided in translational motion within a tube provided with a retaining stop at the lower end and the screw is engaged with a rotary drive rod rigidly fixed to a rotor which is rotatably mounted within said casing tube. The control-rod actuating device essentially comprises an assembly or so-called second assembly for limiting the upward motion of the control rod in the event of failure of said leak-tight casing tube. Said second assembly comprises means for limiting the upward displacement of the broken portion of said casing tube under the action of a vertical thrust resulting from said failure, means for rotational locking of said rotor and calibrated elastic means for producing action on the rotor in opposition to said vertical thrust.

By virtue of said second assembly which is totally inactive during normal operations for suitable calibration of the elastic means aforesaid, the device according to the invention offers an advantage in that the upward travel of a control rod can be limited in a satisfactory manner in the event of depressurization of the reactor vessel and that the control rod is maintained by the second assembly in its locked position within the reactor core. Moreover, a control rod drop is permitted at each instant either before or during the very first instants after depressurization of the reactor vessel. Once pressure equilibrium has been restored, the device does not interfere to any extent whatsoever either with the upward movement or downward movement of the control rod.

In accordance with the invention, the means aforesaid for limiting upward displacement of said first assembly preferably comprise a rigid wall which is placed above said casing tube and constitutes a retaining stop for the broken portion of said casing tube.

Furthermore, the aforesaid means for rotational locking of the rotor preferably comprise on the one hand a dog-coupling system between the rotor and the internal wall of the casing tube and, on the other hand, a groove formed in the aforesaid rigid wall and adapted to cooperate with a key forming part of the external wall of said casing tube.

It should be noted at this juncture that the aforementioned groove and key cooperate with the dog-coupling system when the casing tube is broken below said dog-coupling system so that the portion of this latter which is carried by the internal wall of the casing tube is secured against rotation.

Thus the dog-coupling system is intended to couple the rotor either with the unbroken stationary portion of the casing tube in the event of failure of this latter above the dog-coupling system or with the broken portion of the casing tube which is secured against rotation by means of the aforementioned key and groove in the event of failure of the casing tube below the dog-coupling system.

A further point worthy of note is that a dog-coupling system has the advantage of producing very rapid action when provision is made for a suitable number of coupling teeth or dogs.

In accordance with a particularly advantageous arrangement, the rod-actuating device essentially comprises in addition an assembly which is designated as a third assembly for maintaining the control rod in the dropped position in the event of overturning of the reactor. Said third assembly comprises a sleeve which forms a downward extension of said casing tube for guiding the nut in translational motion, a connecting tube between the nut and the control rod, a plurality of resilient strips made integral at one end thereof with the nut-retaining stop and adapted to carry a roller at the free end thereof. After a control-rod drop, said roller is capable of engaging within at least one groove provided in the external wall of said connecting tube. Finally, said third assembly comprises a weight block supported by an annular shoulder formed on the internal wall of said sleeve and means for retaining said weight block, after overturning of the reactor, in a position in which said block maintains the rollers within one of said grooves.

For the sake of enhanced safety, two or three grooves are provided in the connecting tube in order to ensure perfect location of the weight block in the locking position.

This arrangement is of considerable advantage in the case of a nuclear reactor designed for ship propulsion. In point of fact, it is thus possible to maintain the control rods in the dropped position at the time of overturning of the nuclear reactor, especially in the event of capsizing of the ship on which the nuclear reactor is installed.

The distinctive features and advantages of the present invention will be more clearly brought out by the following description of one exemplified embodiment of the device according to the invention which is given by way of illustration but not in any limiting sense, reference being made to the accompanying drawings, wherein:

FIG. 1 illustrates the upper portion of the pressure-resistant vessel 1 of a nuclear reactor of the pressurized-water type closed by a lid or so-called closure head 3.

Within said pressure vessel 1, there is shown diagrammatically the reactor core 5 constituted by fuel assemblies housed within casings as designated by the reference 6 and placed within a cylindrical shell 7 or core jacket which surrounds the reactor core.

Figure 1:
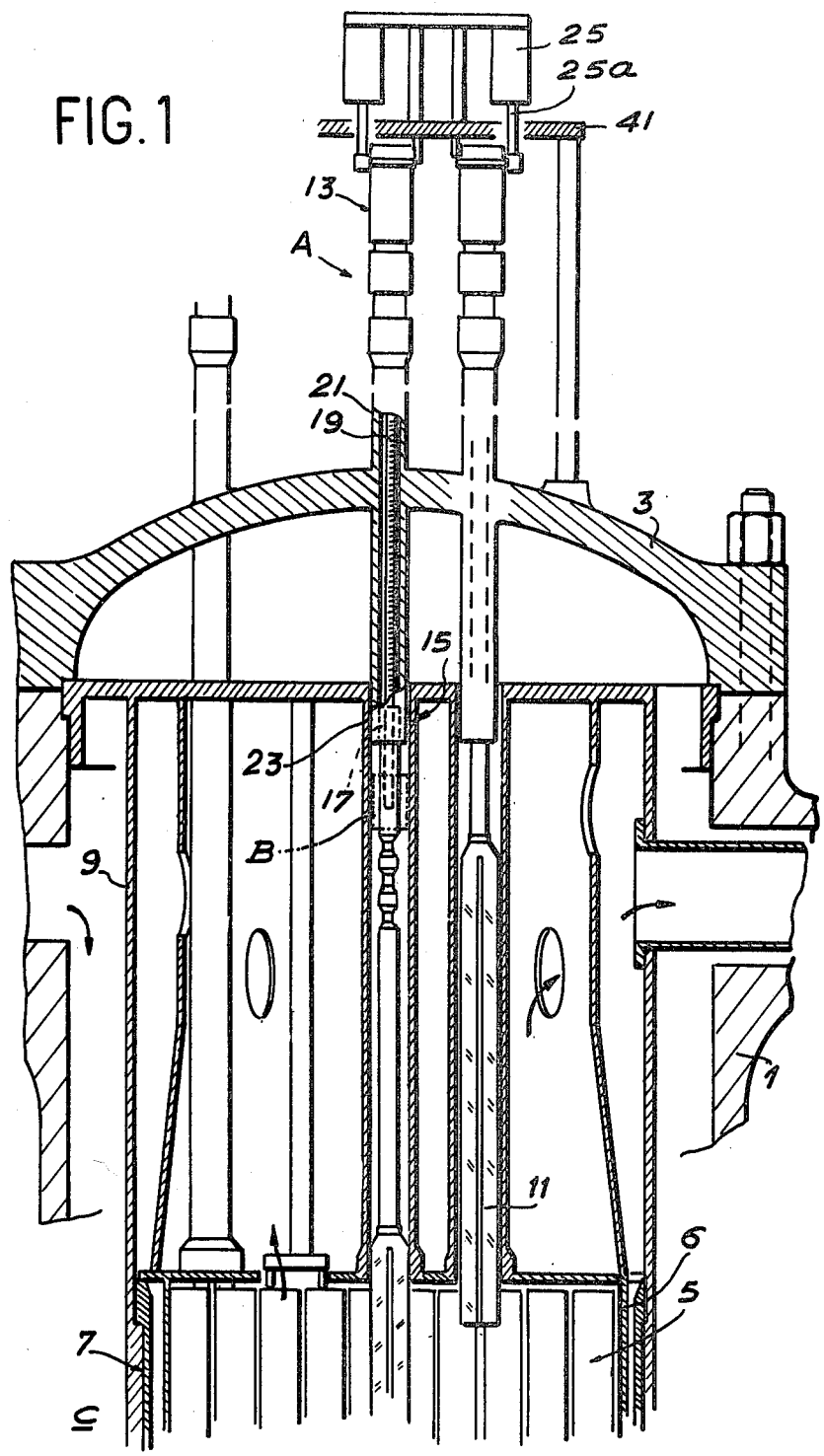
FIG. 1 is a vertical sectional view of the upper portion of the pressure vessel of a nuclear reactor of the pressurized-water type in which the device according to the invention is intended to be employed.

As shown in FIG. 1, a support structure 9 for internal reactor elements is provided within the pressure vessel above the reactor core 5. Reactor control rods such as the rod 11 are capable of vertical displacement within said support structure and are intended to be inserted into the reactor core 5 to a greater or lesser depth.

The upper end of each control rod 11 is coupled to an assembly 15 for controlling the movement of translation and dropping of the control rod. Said assembly is placed in the axis of the control rod 11 and extends above the closure head 3 into a leak-tight casing tube 13 which is rigidly fixed to said closure head around the periphery of an orifice formed in this latter in order to permit displacement of the moving elements of the assembly 15 through the closure head 3. Only the devices for actuating said assembly, such as a reduction-gear motor 25, are placed externally of said leak-tight casing tube 13.

It is noted that said assembly 15 comprises a screw and nut system (19, 17) which is coupled to the control rod 11 by means of the nut 17, said nut being secured against rotation and guided in translation within a tube 21 provided at the lower end with a retaining stop 23.

It should be explained at this point that the novel assemblies of the control-rod actuating device according to the invention are intended to limit and then to arrest the upward travel of a control rod in the event of failure of the casing tube 13 and to maintain said rod in the dropped position in the event of overturning of the reactor, said assemblies being located respectively in the zones designated by the references A and B in FIG. 1.

Figure 2:
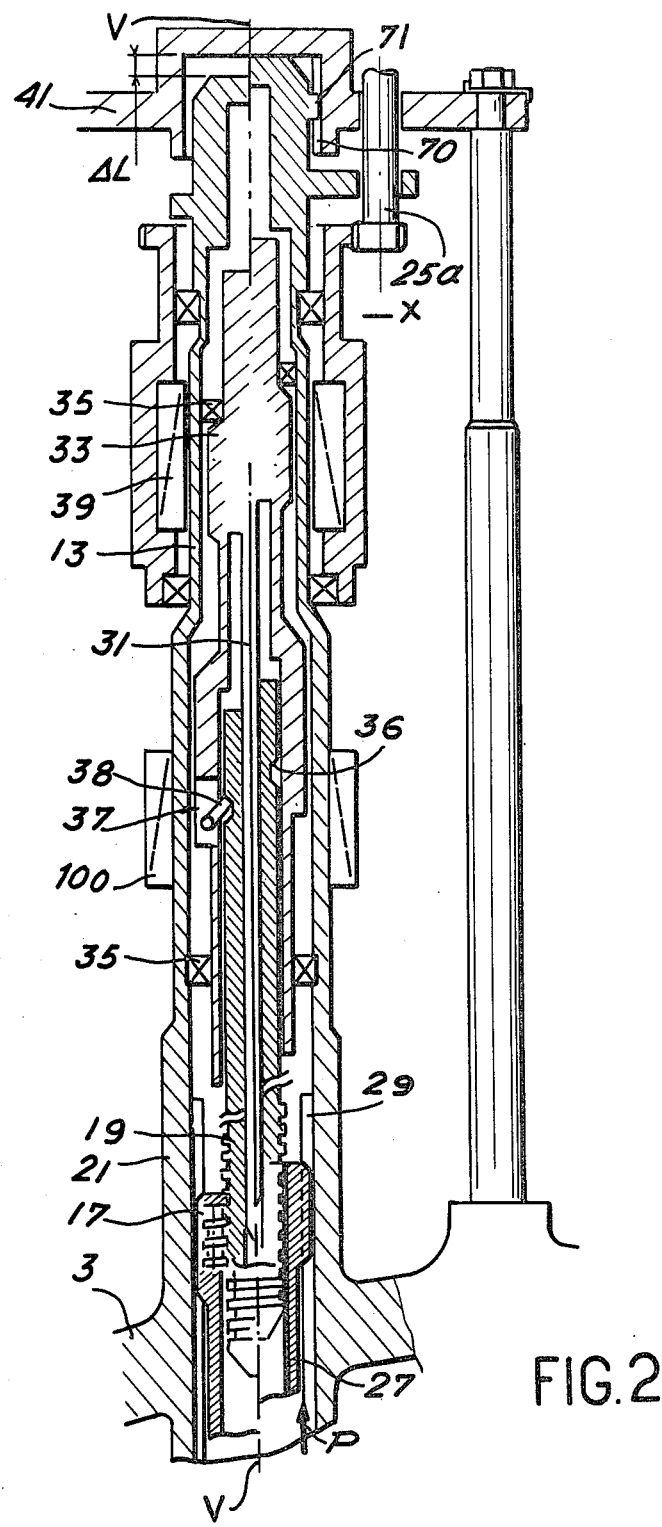
FIG. 2 is an enlarged sectional view of the control-rod actuating device illustrated in FIG. 1 in which said second assembly for limiting upward travel of a control rod in the event of depressurization of the reactor vessel is illustrated only in schematic form.

FIG. 2 shows a diagrammatically in cross-section the upper portion of the assembly 15 of the device for actuating a control rod which is housed within said leak-tight casing tube 13.

There can again be seen in FIG. 2 the nut 17 which is coupled to a control rod 11 by means of a connecting tube 27 which is rigidly fixed at each end to said nut 17 and to said control rod 11.

It is noted that the nut 17 is keyed rotationally within the tube 21 by means of grooves 29 cut in the internal wall of said tube.

Furthermore, it is apparent from FIG. 2 that the screw 19 which is engaged with the nut 17 is provided with an axial bore, the upper portion of which is engaged with a square rod 31 for driving said screw 19 in rotation. To this end, said square rod 31 is rigidly fixed at the upper end thereof to an annular rotor 33 supported by the wall of the casing tube 13 on ball-bearings as designated by the reference 35.

Moreover, it is noted from FIG. 2 that a device 37 for retaining the screw 19 is fixed on the rotor 33 in order to hold the screw in position during a low-speed translational displacement of the control rod. This retaining device 37 comprises a set of hooks 38 actuated by magnetic coupling and adapted to cooperate with a recess 36 formed in said screw 19.

It should be explained in addition that the rotor 33 as well as the retaining device 37 which are driven in rotation as mentioned in the foregoing are each associated with a suitable control element which generates a magnetic field and is placed externally of said leak-tight casing tube 13. Said rotor is actuated by means of a magnetic coupling system constituted by a magnetic drive unit 39 which is driven in rotation by the reduction-gear motor 25. The retaining device 37 is actuated by electromagnetic coupling means comprising an electromagnet coil 100.

It is recalled that the operation of a device for actuating a control rod 11 as illustrated in FIG. 2 takes place as follows:

for low-speed translational displacement of the control rod 11 when the screw 19 is maintained stationary by the retaining device 37, the rotor 33 is caused to rotate by the magnetic drive unit which traverses the casing tube 13, thus driving in rotation the square rod 31 which is integral with or rigidly fixed to said rotor. Said square rod 31 then drives the screw 19 in rotation. Depending on its direction of rotation, the screw 19 produces an upward or downward movement of the nut 17 and therefore of the control rod 11;

for an emergency drop of the control rod 11, interruption of the current supply to the retaining device 37 causes withdrawal of the hooks 38 from the recess 36 of the screw 19. Thus said control rod falls under the action of gravity;

for upward displacement of the screw 19 in order to produce subsequent withdrawal of the control rod 11 after a drop, the square rod 31 is caused to rotate in a direction which would permit the downward movement of the nut 17 if this latter were not retained by the stop 23. Thus the rotation of said rod 31 imparts an upward helical movement to the screw since the nut is fixed translationally.

It should be explained with reference to FIG. 2 that failure of the leak-tight casing tube 13 is followed by depressurization of the reactor pressure vessel 1, with the result that said assembly 15 for controlling translational motion and dropping of a control rod is subjected to a vertical thrust designated in FIG. 2 by the reference P. When this device is not provided, said vertical thrust causes unscrewing of the screw and nut system and therefore ejection of the control rod.

It is consequently apparent from FIG. 2 when comparing the portions located respectively to the left and to the right of the vertical axis V that said assembly 15 undergoes an upward displacement which permits operation of the assembly so as to limit the upward displacement of the control rod at the time of failure of the leak-tight casing tube.

In accordance with one of the distinctive features of the invention, the device therefore comprises a rigid wall 41 placed above the casing tube 13 and constituting a stop for limiting to a value Δ1 the range of travel of the broken portion of said casing tube 13.

It is also worthy of note that the device according to the invention comprises means for rotational locking of the rotor 33 when the broken portion of the casing tube 13 is abuttingly applied against the rigid wall 41. Said locking means comprises on the one hand a groove 70 which is provided in the rigid wall 41 and in which is engaged a key 71 forming part of the casing tube 13 and, on the other hand, a rotational locking system located within the zone designated by the reference A in FIG. 1 between the external wall of the rotor 33 and the internal wall of said casing tube 13, said system being illustrated in FIG. 3.

As will hereinafter be explained in greater detail, the groove 70 and the key 71 contribute to rotational locking of the rotor with the dog-coupling system mentioned in the foregoing only when the casing tube 13 is fractured beneath this latter.

Figure 3:
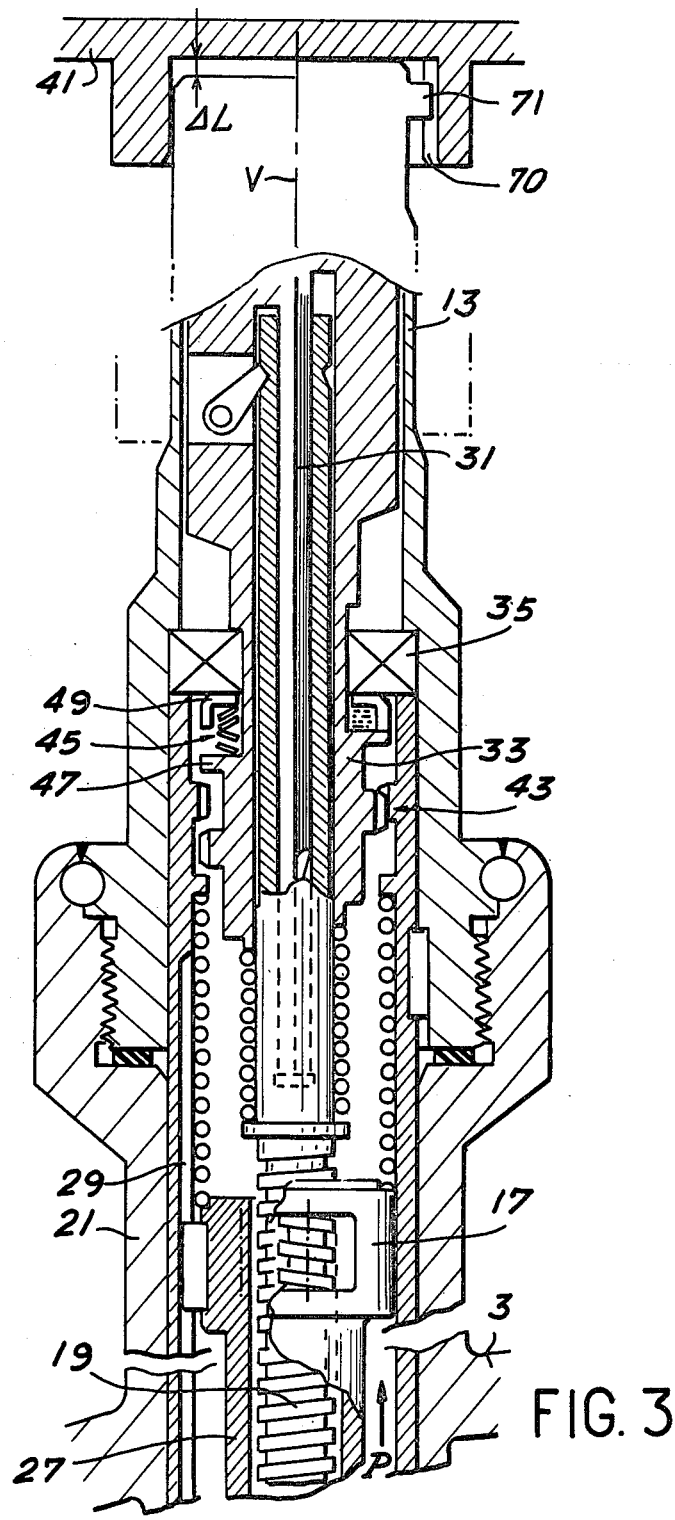
FIG. 3 is a vertical sectional view of the upper portion of a control-rod actuating device in which the second assembly aforesaid is illustrated in more precise detail.

In FIG. 3, the aforesaid means for rotational locking of the rotor 33 are illustrated in greater detail. The portions of this figure which are located to the left and to the right of the vertical axis V of the device show respectively the arrangement of the components of the device prior to failure of the casing tube 13 and the arrangement of these latter after failure of said casing tube 13.

There are again shown in FIG. 3 the rotor 33 which is supported on the casing tube 13 by ball-bearings such as those designated by the reference 35 and rigidly fixed to a rod 31 for driving the screw 19 in rotation, said screw being engaged with said rod.

It is apparent from this figure that, in accordance with one of the distinctive features of the invention, a dog-coupling system 43 is placed between the respective walls of the rotor 33 and of the leak-tight casing tube 13.

Furthermore, it is noted in FIG. 3 that a spring 45 is interposed between a flat wall 47 of the rotor 33 and a cap 49, said spring being intended to apply a downwardly directed vertical force on the rotor in opposition to said vertical thrust P resulting from fracture of the leak-tight casing tube 13.

The following description relates to the mode of action of the control-rod actuating device in accordance with the invention comprising the wall 41 and the system 43, depending on whether the casing tube 13 is fractured below or above the dog-coupling system 43.

At the time of failure of the leak-tight casing tube 13 below the system 43, the broken portion of the casing tube together with the rotor 33 and therefore the upper portion of the assembly 15 undergo vertical upward displacements, the ranges of which are substantially equal and limited by the broken portion of the casing tube as this latter comes into abutting contact with the rigid wall 41.

It is worthy of note that the broken portion of the casing tube 13 is locked rotationally by means of the groove 70 and the key 71, thereby ensuring that the portion of the dog-coupling system which is carried by the internal wall of the casing tube 13 is secured against rotation.

As a result of the upward displacements of the casing tube 13 and of the rotor 33 over a small distance of the order of 2 or 3 cm, said rotor is locked rotationally by means of said dog-coupling system 43 which is secured against rotation. This accordingly prevents any upward displacement of the control rod 11 caused by driving the screw 19 in rotation by means of the nut 17 to which the vertical thrust is applied as a result of the pressure difference ΔP.

Furthermore, in the event of failure of the casing tube 13 above the system 43, the broken portion of said casing tube 13 undergoes an upward displacement which is limited by the stop 41 whilst the rotor undergoes an upward displacement which is limited by engagement of said rotor with the dog-coupling system 43.

It is noted that the spring 45 is intended to permit rotational locking of the rotor 33 by means of the dog-coupling system 43 only in respect of a thrust P in excess of a given threshold value which is a function of the calibration of said spring 45 and to permit disengagement of said rotor 33 when pressure equilibrium is restored in order to resume translational displacement of the control rod 11.

The aforementioned calibration of the spring is effected at a sufficiently high value to ensure that engagement by means of the dog-coupling system cannot take place under normal operating conditions. In one example of construction, the device produces action only in respect of a vertical force exceeding 1200 daN.

It should be mentioned that rotational locking of the rotor 33 can take place very rapidly in respect of a suitable number of coupling teeth or dogs on this latter. For example, if provision is made for five coupling dogs on each component, the rotor will perform only 1/5 of a revolution, which corresponds to a vertical displacement of less than 2 mm for the type of control rod which is contemplated.

It should further be observed that the dog-coupling system located above the nut 17 makes it possible to initiate dropping of the control rod 11 if necessary after rotational locking of the rotor 33.

Figure 4:
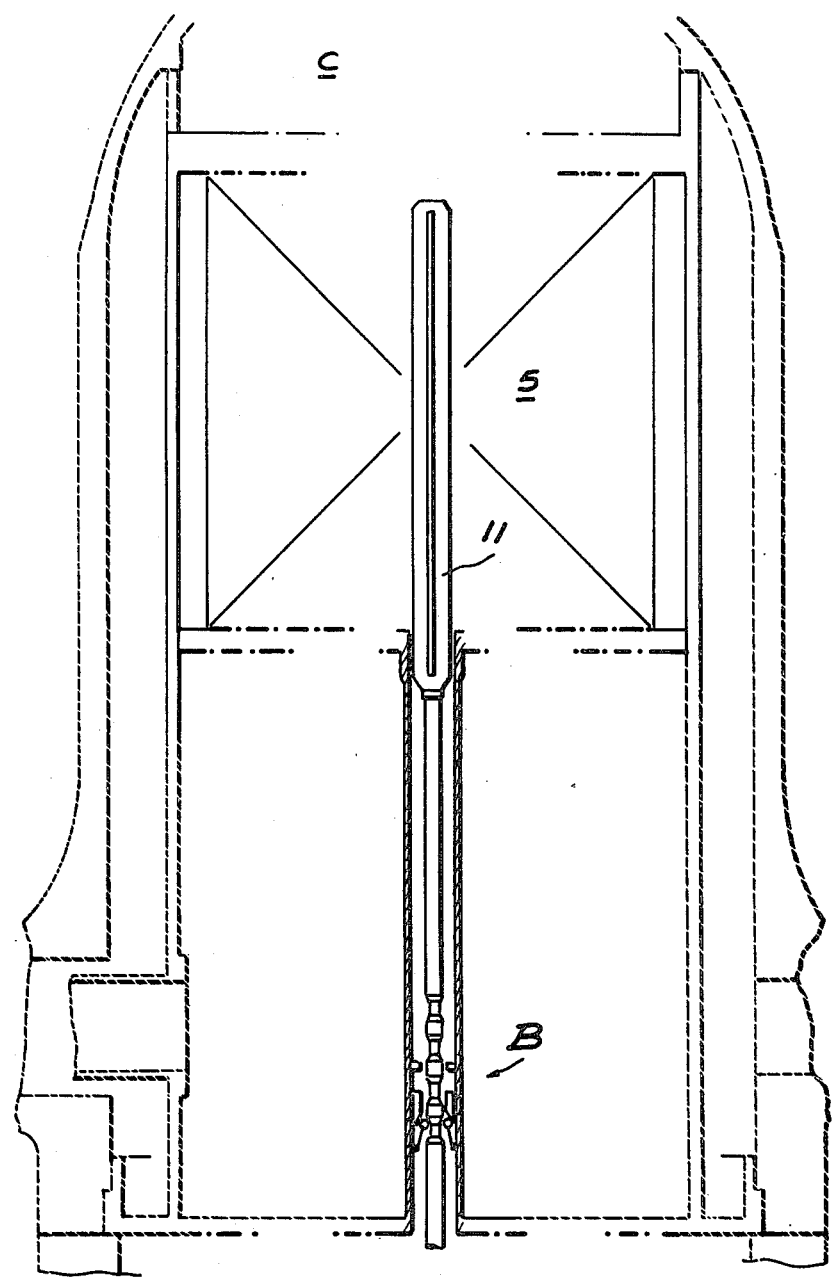
FIG. 4 is also a vertical sectional view showing the lower portion of the pressure vessel of an inverted nuclear reactor showing the localization of the third assembly of the control device for maintaining a control rod in the dropped position at the time of overturning of the nuclear reactor to an inverted position.

In FIG. 4, the lower portion of the pressure vessel 1 of the nuclear reactor shown in FIG. 1 is illustrated in the inverted position which may result, for example from capsizing of a ship on which said reactor has been installed.

This figure shows that, in accordance with a distinctive feature of the invention, the device for actuating the control rod 11 comprises an assembly B at the lower portion of said device. When the reactor is in an inverted position, said assembly B is intended to maintain the control rod 11 in a position in which it is fully inserted in the reactor core 5 and which corresponds to reactor shutdown.

Said assembly B is thus intended to prevent the control rod 11 from falling out of the reactor core under the action of gravity and thus putting the reactor back into operation.

Figure 5:
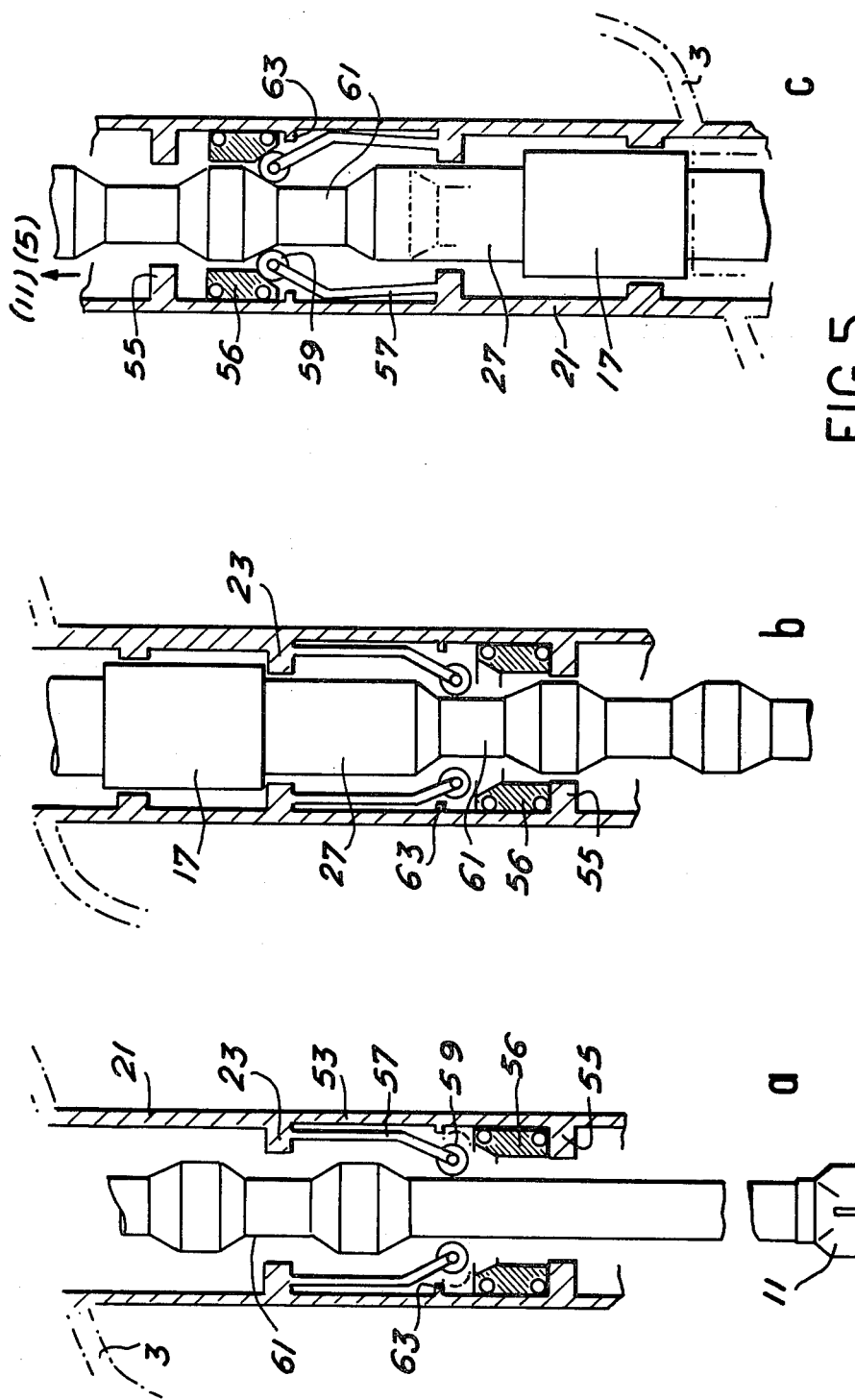
FIGS. 5a, 5b and 5c are sectional views showing the aforesaid third assembly of the actuating device.

FIGS. 5a, 5b and 5c show the assembly B for maintaining the control rod 11 in its dropped or fully inserted position at the time of overturning of the reactor. FIG. 5a shows the arrangement of the components of said assembly B during a downward movement of insertion of the control rod 11; FIG. 5b shows the arrangement of the components of the assembly B after dropping of a control rod 11 and prior to overturning of the reactor; and FIG. 5c shows the mode of action of the assembly B after overturning of the reactor.

FIGS. 5a to 5c show the tube 21 in which the nut 17 is guided in translational motion, said nut being coupled to the control rod 11 by means of the tube 27.

It is apparent from these figures that, within the interior of a sleeve 53 forming an extension of said tube 21 for guiding the nut 17 and provided with an annular shoulder 55 on the internal wall of said sleeve, the aforementioned assembly B is constituted on the one hand by a plurality of resilient strips such as the strip 57 each made integral at the upper end thereof with the stop shoulder 23 for retaining the nut 17 and adapted to carry a roller 59 at the lower end thereof and, on the other hand, by a wheeled weight block 56 supported by said annular shoulder 55.

It is seen in FIG. 5b that each roller 59 is intended to be engaged in one of the grooves 61 formed in the wall of the connecting tube 27 between the nut and the control rod 11 after dropping of a control rod, that is to say when the nut 17 is applied against the retaining stop 23.

It can be observed from FIG. 5c that, after overturning of the reactor vessel, the wheeled weight block 56 moves under the action of gravity from its initial position in which it is applied against the annular shoulder 55 to a position in which it is applied against a stop 63 formed on the internal wall of the sleeve, thus limiting the range of travel of the wheeled weight block. The weight block serves to maintain the rollers 59 within the groove 61 of the tube 27, thereby preventing downward displacement of the screw and nut system and therefore of the control rod.

The mode of action of the assembly B described in the foregoing therefore essentially consists in maintaining the nuclear reactor in the shutdown condition after overturning of the reactor, this being achieved by falling of the weight block 56 to the stop 63 under the action of gravity.

It is pointed out that the weight block is immediately applied against the stop 63 in the event of overturning of the reactor, thus preventing any commencement of a downward movement of the control rod 11. In consequence, the control rod 11 is automatically and reliably locked in the fully inserted position.

A number of grooves 61 are formed on the connecting tube, thus ensuring a higher degree of operational safety of the system.

We claim:

1. A nuclear reactor control rod actuating device of the type comprising an assembly or so-called first assembly for carrying out a low-speed translational displacement and dropping of the control rod, said assembly being constituted by a leak-tight casing tube rigidly fixed to the closure head of the nuclear reactor pressure vessel and adapted to communicate with said pressure vessel, a screw and nut system coupled to the control rod by means of the nut and a screw-retaining device capable of releasing said screw, the nut being secured against rotational motion and guided in translational motion within a tube provided with a retaining stop at the lower end and engaged with a rotary drive rod rigidly fixed to a rotor which is rotatably mounted within said casing tube, wherein said control-rod actuating device comprises an assembly or so-called second assembly for limiting and then arresting the upward motion of the control rod in the event of failure of said leak-tight casing tube, said second assembly being constituted by means for limiting the upward displacement of the broken portion of said casing tube under the action of a vertical thrust resulting from said failure, means for rotational locking of said rotor and calibrated elastic means for producing action on the rotor in opposition to said vertical thrust.

2. A device according to claim 1, wherein said means for limiting the displacement of said first assembly comprise a rigid wall which is placed above said casing tube and constitutes a retaining stop for the broken portion of said casing tube.

3. A device according to claim 2, wherein said means for rotational locking of said rotor comprise on the one hand a dog-coupling system between the rotor and the internal wall of the casing and on the other hand a groove formed in the aforesaid rigid wall and adapted to cooperate with a key forming part of the external wall of said casing tube.

4. A device according to claim 1, wherein said calibrated elastic means are constituted by springs interposed between a flat wall of the rotor and an annular cap mounted on said rotor.

5. A device according to claim 1, wherein said device comprises a so-called third assembly for maintaining the control rod in the dropped position in the event of overturning of the reactor, said third assembly being constituted by a sleeve which forms a downward extension of said casing tube for guiding the nut in translational motion, a connecting tube between the nut and the control rod, a plurality of resilient strips made integral at one end thereof with the nut-retaining stop and adapted to carry a roller at the free end thereof, said roller being capable of engaging within at least one groove formed in the external wall of said connecting tube after a control-rod drop, and a weight block supported by an annular shoulder formed on the internal wall of said sleeve and means for retaining said weight block in a position in which it maintains the rollers within one of said grooves after overturning of the reactor.

* * * * *